Figure 1:
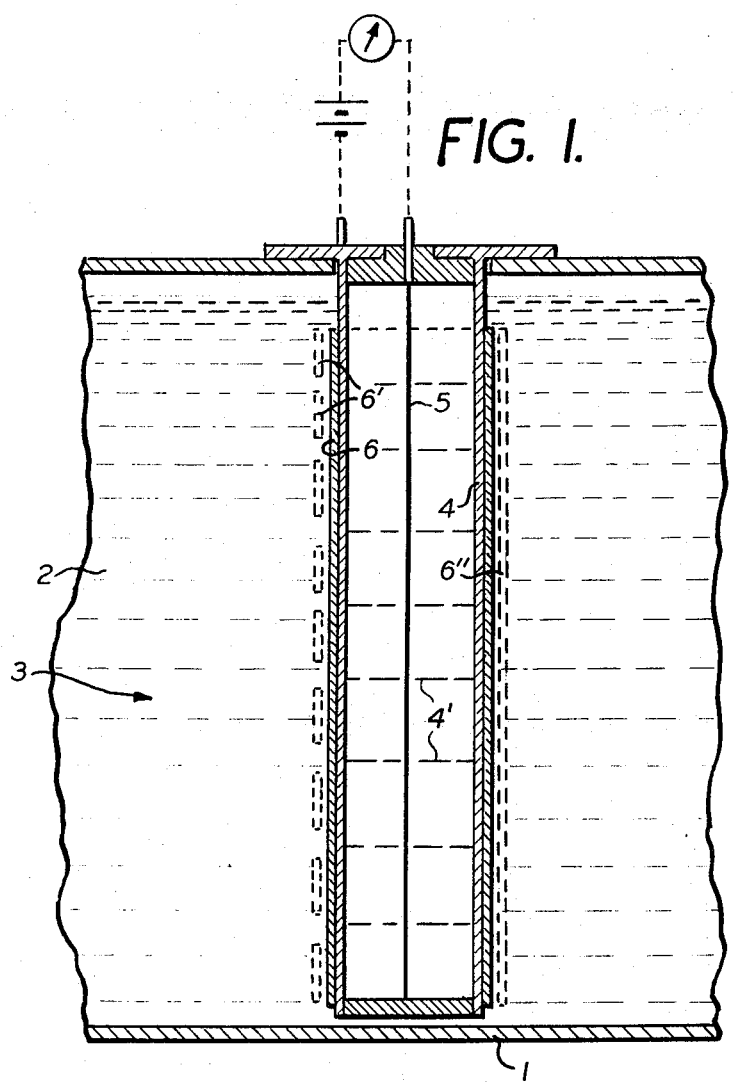

United States Patent [19]

Bagge et al.

[11] 3,787,682

[45] Jan. 22, 1974

[54] APPARATUS FOR MEASURING THE FILLING LEVEL IN LIQUID RECEIVING CONTAINERS BY MEANS OF RADIO-ACTIVE RAYS

[75] Inventors: Erich Rudolf Bagge, Kiel; Joachim Trumper, Strande/Kiel; Joachim Knaak, Erzhausen, all of Germany

[73] Assignee: Vdo Tachometer Werke Adolf Schindling GmbH, Frankfurt, Germany

[22] Filed: Apr. 29, 1970

[21] Appl. No.: 32,892

[30] Foreign Application Priority Data
Oct. 21, 1966    Germany............... 1573106
Dec. 3, 1969    Germany............... 1960582

[52] U.S. Cl........................ 250/43.5 FL, 250/83.1
[51] Int. Cl........................ G01n 23/10, G01t 3/00
[58] Field of Search................. 250/83.1, 43.5 FL

[56] References Cited
UNITED STATES PATENTS
2,873,377   2/1959   McKay............................ 250/83.1
2,950,393   8/1960   Southward....................... 250/83.1
3,009,062   11/1961  Brooksbank, Jr. et al......... 250/83.1
3,463,920   8/1969   Kraushaar..................... 250/43.5 FL
3,555,274   1/1971   Baurmash et al.............. 250/43.5 FL FOREIGN PATENTS OR APPLICATIONS
1,154,953   9/1963   Germany..................... 250/43.5 FL Primary Examiner—Archie R. Borchelt
Attorney, Agent, or Firm—Ernest G. Montague

[57] ABSTRACT

An apparatus for measuring the volume of hydrogen-containing liquids in containers by means of radioactive rays by feeding energy-rich neutrons from neutron sources into the liquid and the intensity of said rays of the thermal neutrons, braked in the liquid to thermal energies, being measured by means of detectors, which comprises neutron sources and detectors. The neutron sources and the detectors are combined to rod-like measuring sondes, and at least one detector is formed for thermal neutrons as a straight or curved rod. The sources are disposed at least parallel to the axis of the rod selectively continuously or in a predetermined manner discontinuously.

11 Claims, 1 Drawing Figure

INVENTORS
ERICH BAGGE
JOACHIM TRÜMPER
JOACHIM KNAAK

APPARATUS FOR MEASURING THE FILLING LEVEL IN LIQUID RECEIVING CONTAINERS BY MEANS OF RADIO-ACTIVE RAYS

The present invention relates to an apparatus for measuring the filling state in liquid containers with radioactive rays, in general, and in which energy-rich neutrons produced outside of the hydrogen-containing liquid volume are fed into the liquid and the radiation intensity of the neutrons braked in the liquid for thermal energies and neutrons emerging therefrom are measured in the vicinity of the liquid volume by means of known measuring devices and in which the neutron sources are joined in a continuous or predetermined discontinuous distribution on a straight or curved rod jointly with at least one detector for thermal neutrons effective along the length of the rod to a measuring sonde, in particular.

For the measuring of a predetermined height level of any selected filling goods in a container, a measuring sonde is known, which has in the measuring head screwable into a side wall of the container a radiation-sensitive member and carries a radiation source in a variable distance oppositely to the member at the end of a rod connected with the measuring head. Another known method for measuring the volume of hydrogen-containing liquids in containers, which exploits the volume-dependent moderation effect of such liquids to energy-rich neutrons for the measuring of the content, uses synthetic neutron sources, which are mounted on the outside on the liquid container. In the vicinity or at a larger distance from the neutron source, one or a plurality of detectors for thermal neutrons are provided within or outside of the container wall, which detectors can indicate the fast neutrons emerging from the neutron source then only, if they arrive after the braking process in the hydrogen-containing liquid in the container at thermal energies.

The provision of the neutron source and of the detectors at the tank wall has the disadvantage, however, that for reasons of spatial angles from the start only about the half of all energy-rich neutrons emerging from the source becomes effective and thermal neutrons braked by the detectors become absorbed. The spatial separation of source and detectors causes in addition a certain intensity reduction of the thermal neutrons to be measured, since during the braking process of fast neutrons, the energy-rich thermal neutrons reach in the immediate vicinity of the source their intensity-maximum. The intermediate switching of the absorbing moderator leads, however, at a spatial separation to a traceable intensity loss of the radiation.

For avoidance of these drawbacks and improvement of the measuring, the present invention provides, that the neutron sources and detectors are combined to rod-shaped measuring sondes, known per se, such, that at least one detector for thermal neutrons is formed as a straight or curved rod and the neutron sources are disposed along the axis of the rod or parallel thereto, continuously or distributed discontinuously in a predetermined manner. The neutron sources can thereby be provided outside as well as inside of the detector, either parallel to its axis or concentrically about its axis. The measuring sonde can be provided at any position in the container or in the vicinity of the container, most suitably, however, suspended in the liquid volume. Such an arrangement has the advantage that the detector and the neutron sources are surrounded in an optimum manner by the measuring liquid cylindrically-symmetrically and since the density of the thermal neutrons has its maximum in the axis of the rod about the neutron sources sitting on the measuring sonde, the detector receives the radiation with the maximum intensity of the thermal neutrons.

This embodiment brings about furthermore the advantage, that by equal distribution of the sources along the measuring sonde, a linear connection between the suspension depth of the sonde into the liquid and the counting rate of the detector results. In containers having constant cross section, the filling state indication is linear. In containers of complicated form, by a suitable, unequal distribution of the sources along the measuring sonde, a linearization of the graduating characteristic sonde can be obtained. The detector rod with the neutron sources can be suspended into a tubular-shaped opening of the container or into the liquid itself. Its dimensions can be chosen thereby such, that the measuring sonde can be inserted instead of sondes, which operate in accordance with other proof-principles. It is possible thereby, also there, where until now liquid level determinations have been performed with capacity proving devices, to use the neutron measuring sonde as a substitute.

By a suitable non-linear distribution of the neutron sources of the measuring sonde, the graduating characteristic can also be produced artificially, which is of interest for predetermined purposes. By example, by a more dense arrangement of the neutron sources in the neighborhood of the bottom of the container, an increased proof-sensitivity of small liquid quantities can be obtained and thereby, an indication of the remaining quantities can take place with greater exactness, which also can be used for the release of a warning device.

As it has been stated above, a linear connection between the liquid volume and the counting rate of the detector and, thereby, of the indication with constant cross section of the liquid container by an equal distribution of the neutron sources on the measuring sonde and with complicated container cross section forms can be obtained by a corresponding unequal distribution of the neutron sources. In other words, by a predetermined distribution of the neutron sources on the sonde, nearly any desired graduation characteristic can be produced. In order to obtain the desired graduation characteristic required for radiation distribution, it is necessary to provide, since it is difficult, to produce neutron sources with an exactly equal radiation intensity, either an exact local securing of the individual radiation sources to each other on the sonde, which can be determined by example empirically or a multiplicity of neutron sources, since otherwise the different radiation intensity of the individual neutron sources leads to great break-in's or points in the radiation density distribution. This arrangement brings about in both cases appreciable production difficulties and upon using a multiplicity of neutron sources additionally an appreciable increase of the material costs, since for safety reasons each neutron source must be enclosed in a steel capsule in order to prevent a contamination of the radioactive substance.

It is therefore one object of the present invention to provide an apparatus for measuring the filling state in liquid containers with radioactive rays, wherein for the setting of the desired graduation characteristic between each detector and the liquid a layer, preferably a cadmium layer, absorbing thermal neutrons having a predetermined thickness and/or face selected in accordance with the desired arrangement of the graduation characteristic is provided. By such structure, the setting of the graduation characteristic can be performed practically independent from the distribution of the neutron sources, solely by a differently strong screening of the detector or detectors relative to the thermal neutrons, which means that not only neutron sources of different radiation intensity in a conventional number can be employed, rather also an exact local fixing of the individual neutron sources relative to each other can be disregarded.

The layer, disposed between each detector and the liquid, which layer is mounted most suitably directly on each detector, can extend over the entire effective detector face or only over a part thereof. In the first case, the layer thickness is not permitted to surpass the value at which a complete absorption of the thermal neutrons occurs, since otherwise the detector would no more respond to thermal neutrons, while in the second case, the layer thickness can also be chosen with a greater value. The application of the layer and of the layers, respectively, to the detector or the detectors, respectively, takes place with advantage by electrolytical means, whereby the different layer thicknesses are obtained, for example, by variation of the duration of the deposit. If only a portion of the effective detector face is to be equipped with a layer, provided a certain reduction of the indication exactness can be taken in stride, also differently large and/or differently thick cadmium metal sheets can be used under circumstances in the form of masks, which are glued to the detector or are welded thereto.

By the setting of the graduation curve nearly independently from the radiation intensity of the neutron sources, the possibility finally exists, to further reduce the production costs of the measuring sonde by reduction of the number of the neutron sources. In a preferred embodimnet, the neutron sources are joined to a single line source extending over the length of the rod. This leads due to the presence of merely a single steel capsule evidently not only to an appreciable material saving, rather also to an essentially simpler mounting of the neutron source.

Figure 2:
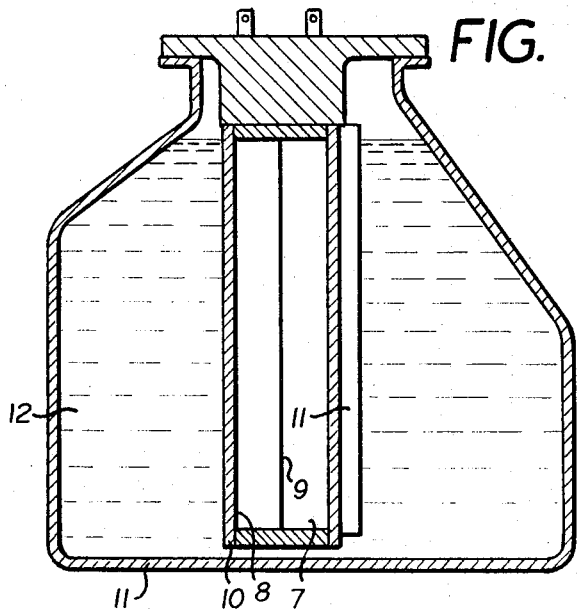

With these and other objects in view, which will become apparent in the following detailed description, the present invention, which is disclosed by example only, will be clearly understood in connection with the accompanying drawings, in which:

FIG. 1 is a schematic longitudinal section of the apparatus for measuring the volume of hydrogen-containing liquids in containers, shown in a simplified schematic manner; and FIG. 2 is a vertical section of another embodiment of the apparatus designed in accordance with the present invention.

Referring now to the drawings, and in particular to FIG. 1, the apparatus comprises a container 1 for the hydrogen-containing liquid 2, for example hydrocarbons (energy material), and as a detector, which constitutes practically the measuring sonde, a commercially conventional rod-shaped boron- or helium-counting tube 3 with a tube jacket 4 as a cathode and a wire-shaped anode 5 disposed in the axis are insertable into an opening provided in the container cover.

The cathode 4 and the anode 5 of the counting tube 3 are connected by means of a current source with the indication device. The neutron source 6 is applied in the shown embodiment as a face source concentrically to the detector over the entire jacket of the counting tube 3. Yet also a plurality of individual sources can be distributed over the length of the measuring sonde continuously or discontinuously (6') on the jacket of the counting tube 3. A plurality of detectors 4' can also be arranged and to constitute an elongated probe. Such concentric arrangement of the neutron sources brings about an optimum sensitivity of the measuring device, because the radiation intensity of the thermal neutrons has its maximum in the axis of the measuring sonde. A rod-shaped formation of the neutron source over the length of the counting tube 3 and its arrangement on the latter parallel to the axis of the measuring sonde 6'' is likewise possible and usable because the sensitivity loss by the eccentric arrangement is very small only due to the small diameter of the sonde. Also an arrangement of the neutron sources inside of the counting tube 3 and in its axis on the anode 5 is possible, and requires, however, a spatial structure of the counting tube and is, therefore, correspondingly more expensive.

In containers, the geometrical formation of which does not permit the insertion of straight measuring sondes, it is possible without difficulty, to obtain an adjustment to the container form by suitable, curved formation of this sonde.

If the measuring process is to be performed in relatively flat containers, for example, of the fuel tanks provided in the wings of aeroplanes, then upon an inclination of the tank, the measuring sonde can be surrounded slightly by the liquid which can lead to an erroneous indication. This can be compensated for such, that a plurality of measuring sondes are distributed over the space volume of the tank, so that upon an inclination of the wings a part of the sondes is surrounded more and another part is surrounded less by liquid. If in this case the measuring results of the individual measuring sondes are joined to a median value, this result can at least in a certain approximation still constitute a usable indication about the liquid content of the container. Also by introduction of an integration time constant in the indication procedure, the indication can be made independent from movement-caused deviations.

Referring now again to the drawings, and in particular to FIG. 2, a measuring sonde is disclosed, in which the rod is substituted by a detector and the measuring sonde comprises a boron- or helium-counting tube 7, serving as a detector with a jacket 8 constituting the cathode and a wire-shaped anode 9. On the jacket 8 of the counting tube 7 is disposed a cadmium layer 10 and a rod-shaped neutron source 11, which extends over the entire length of the counting tube 7. The thickness of the cadmium layer 7 is dimensioned such, that it is small at the point of the greatest cross-sectional face of the container 1a, which contains a hydrogen-containing liquid 12 (wide line spacing), and at the points of the smallest cross-sectional face of the container 11 is largest (narrow line spacing) and between these cross-sectional faces has corresponding intermediate values dependent upon the configuration of the container wall, so that a graduation characteristic and indication characteristic, respectively, results, which characteristic is linear relative to the liquid volume to be measured.

While we have disclosed several embodiments of the present invention, it is to be understood that these embodiments are given by example only and not in a limiting sense.

We claim:

1. An apparatus for measuring the level of a hydrogen containing liquid in a container, comprising
   at least one high energy neutron source disposed to emit neutrons into said liquid,
   an elongated detector means for detecting thermal neutrons which have slowed down in said liquid, and
   said at least one neutron source being disposed on and along the length of said detector means with a predetermined distribution.

2. The apparatus, as set forth in claim 1, wherein said at least one neutron source constitutes a single source extending over the length of said 3. The apparatus, as set forth in claim 2, wherein said neutron source is disposed concentrically to the axis of said detector means.

4. An apparatus for measuring the level of a hydrogen containing liquid in a container, comprising
   at least one high energy neutron source disposed to emit neutrons into said liquid,
   a plurality of detector means for detecting thermal neutrons which have slowed down in said liquid,
   said plurality of detector means being combined to constitute an elongated probe, and
   said at least one neutron source being disposed on and along the length of said probe with a predetermined distribution.

5. The apparatus, as set forth in claim 4, wherein said at least one neutron source constitutes a single source extending over the length of said probe.

6. The apparatus, as set forth in claim 4, wherein said probe has a geometrical configuration complementary to the outer configuration of said container.

7. An apparatus for measuring the level of a hydrogen containing liquid in a container comprising
   at least one high energy neutron source disposed to emit neutrons into said liquid,
   at least one detector means for detecting thermal neutrons which have slowed down in said liquid,
   said at least one neutron source being disposed on and along each detector means,
   a thermal neutron absorbing layer arranged between each detector means, and said liquid, and
   the volume of said layer per unit length varying along the length of each detector means, whereby a desired measuring characteristic can be obtained.

8. The apparatus, as set forth in claim 7, wherein said layer is applied on each of said detector means.

9. The apparatus, as set forth in claim 7, wherein said layer is made of cadmium.

10. The apparatus, as set forth in claim 7, wherein said apparatus is suspended in said liquid.

11. The apparatus, as set forth in claim 7, wherein said at least one detector means constitutes a counting tube.

* * * * *